(12) United States Patent
    Sakurai et al.

(10) Patent No.: US 10,766,602 B2
(45) Date of Patent: Sep. 8, 2020

(54) MECHANICAL DROOP FOR SPOILER OPERATION

(71) Applicant: The Boeing Company, Chicago, IL (US)

(72) Inventors: Seiya Sakurai, Seattle, WA (US); Mark S. Good, Seattle, WA (US); Lisa Schleuter, Mukilteo, WA (US); Kelly T. Jones, Snohomish, WA (US); Gregory M. Santini, Bothell, WA (US)

(73) Assignee: The Boeing Company, Chicago, IL (US)

( * ) Notice: Subject to any disclaimer, the term of this patent is extended or adjusted under 35 U.S.C. 154(b) by 429 days.

(21) Appl. No.: 15/800,710

(22) Filed: Nov. 1, 2017

(65) Prior Publication Data

US 2019/0127044 A1    May 2, 2019

(51) Int. Cl.
| | | |
|---|---|---|
| *B64C 9/06* | (2006.01) | |
| *B64C 9/02* | (2006.01) | |
| *B64C 9/18* | (2006.01) | |
| *B64C 9/32* | (2006.01) | |

(52) U.S. Cl.
CPC .............. *B64C 9/06* (2013.01); *B64C 9/02* (2013.01); *B64C 9/18* (2013.01); *B64C 9/323* (2013.01)

(58) Field of Classification Search
CPC .... B64C 9/02; B64C 9/06; B64C 9/12; B64C 9/18; B64C 9/323
See application file for complete search history.

(56) References Cited

U.S. PATENT DOCUMENTS

| | | | | |
|---|---|---|---|---|
| 2,684,215 A | * | 7/1954 | Ashkenas | B64C 13/345 244/223 |
| 4,533,096 A | * | 8/1985 | Baker | B64C 13/32 244/75.1 |
| 4,717,097 A | * | 1/1988 | Sepstrup | B64C 3/50 244/217 |
| 5,370,011 A | * | 12/1994 | Gilges | F16H 25/20 192/143 |
| 6,802,475 B2 | * | 10/2004 | Davies | B64C 13/32 244/99.2 |
| 7,309,043 B2 | | 12/2007 | Good et al. | |
| 7,464,896 B2 | * | 12/2008 | Carl | B64C 13/341 244/99.2 |
| 7,891,611 B2 | * | 2/2011 | Huynh | B64C 9/16 244/213 |
| 9,296,464 B1 | * | 3/2016 | Tuohimaa | B64C 7/00 |

(Continued)

*Primary Examiner* — Medhat Badawi
(74) *Attorney, Agent, or Firm* — McDonnell Boehnen Hulbert & Berghoff LLP (57) ABSTRACT

A system for mechanical operation of an aircraft wing includes a torque tube rotatable at a first rate of rotation to cause a downward rotation of a control surface relative to the aircraft wing. A gearing assembly including an output shaft is coupled to the torque tube. The torque tube is configured to rotate the output shaft, via the gearing assembly, at a second rate of rotation less than the first rate of rotation. A rotational member is coupled to the output shaft, and the output shaft is configured to drive a rotation of the rotational member. A first end of a linear actuator is coupled to the rotational member at a forward attach point, which is eccentric to a rotational center of the rotational member. The rotational member is rotatable to cause a translation of the forward attach point relative to the aircraft wing.

20 Claims, 7 Drawing Sheets

(56) References Cited

U.S. PATENT DOCUMENTS

| | | | | |
|---|---|---|---|---|
| 9,567,066 B2* | 2/2017 | Guida | | B64C 23/076 |
| 10,112,658 B2* | 10/2018 | Yoon | | B62D 35/007 |
| 2004/0004162 A1* | 1/2004 | Beyer | | B64C 9/18 |
| | | | | 244/216 |
| 2004/0046087 A1* | 3/2004 | Beyer | | B64C 3/48 |
| | | | | 244/219 |
| 2004/0245386 A1* | 12/2004 | Huynh | | B64C 9/16 |
| | | | | 244/99.5 |
| 2005/0011994 A1* | 1/2005 | Sakurai | | B64C 9/16 |
| | | | | 244/212 |
| 2006/0049308 A1* | 3/2006 | Good | | B64C 3/50 |
| | | | | 244/76 A |
| 2006/0102803 A1* | 5/2006 | Wheaton | | B64C 7/02 |
| | | | | 244/214 |
| 2006/0226297 A1* | 10/2006 | Perez-Sanchez | | B64C 9/16 |
| | | | | 244/216 |
| 2006/0245882 A1* | 11/2006 | Khan | | B60P 1/006 |
| | | | | 414/525.5 |
| 2007/0034748 A1* | 2/2007 | Sakurai | | B64C 9/16 |
| | | | | 244/215 |
| 2007/0176051 A1* | 8/2007 | Good | | B64C 9/16 |
| | | | | 244/215 |
| 2007/0252040 A1* | 11/2007 | Kordel | | B64C 7/00 |
| | | | | 244/123.1 |
| 2008/0202269 A1* | 8/2008 | Yamakawa | | B62D 5/008 |
| | | | | 74/422 |
| 2010/0100355 A1* | 4/2010 | Marx | | B64D 45/0005 |
| | | | | 702/183 |
| 2011/0290945 A1* | 12/2011 | Peirce | | B64C 9/22 |
| | | | | 244/213 |
| 2013/0261852 A1* | 10/2013 | Recksiek | | B64C 13/30 |
| | | | | 701/3 |
| 2013/0320151 A1* | 12/2013 | Kordel | | B64C 9/16 |
| | | | | 244/215 |
| 2014/0145039 A1* | 5/2014 | Beyer | | B64C 9/10 |
| | | | | 244/215 |
| 2015/0097087 A1* | 4/2015 | Sakurai | | B64C 9/00 |
| | | | | 244/201 |
| 2015/0360369 A1* | 12/2015 | Ishikawa | | B25J 9/1674 |
| | | | | 29/428 |
| 2018/0346137 A1* | 12/2018 | West | | B64D 27/26 |

\* cited by examiner

MECHANICAL DROOP FOR SPOILER OPERATION

FIELD

The present disclosure generally relates to a system for mechanical operation of an aircraft wing.

BACKGROUND

An aircraft wing may include several control surfaces, such as a flap, generally located at the trailing edge of the wing, as well as a spoiler, generally located adjacent to and forward of the flap on the top side of the wing. Because of their proximity to each other and their cooperative operation in some situations, a given flap and spoiler may have overlapping ranges of motion. The systems used to move these two control surfaces in unison can be complex.

What is needed is an improved way to operate the control surfaces on an aircraft wing.

SUMMARY

In one example, a system for mechanical operation of an aircraft wing is described including a torque tube coupled to a control surface of the aircraft wing, where the torque tube is rotatable at a first rate of rotation to cause a downward rotation of the control surface relative to the aircraft wing. The system also includes a gearing assembly coupled to the torque tube, where the gearing assembly comprises an output shaft, and where the torque tube is configured to rotate the output shaft, via the gearing assembly, at a second rate of rotation that is less than the first rate of rotation of the torque tube. The system also includes a rotational member coupled to the output shaft of the gearing assembly, where the output shaft is configured to drive a rotation of the rotational member, and where a rotational center of the output shaft and a rotational center of the rotational member are concentric. The system also includes a linear actuator with a first end and a second end, where the first end of the linear actuator is coupled to the rotational member at a forward attach point, where the forward attach point is eccentric to the rotational center of the rotational member, and where the rotational member is rotatable to cause a translation of the forward attach point relative to the aircraft wing.

In another example, a method for mechanically operating an aircraft wing is described. The method includes rotating a torque tube at a first rate of rotation, where the rotation of the torque tube causes a downward rotation of a control surface, and where the torque tube is coupled to a gearing assembly comprising an output shaft. The method also includes reducing, via the gearing assembly, the first rate of rotation of the torque tube to a second rate of rotation that is less than the first rate of rotation. The method also includes rotating the output shaft at the second rate of rotation, where the output shaft is coupled to a rotational member, and where a rotational center of the output shaft and a rotational center of the rotational member are concentric. The method further includes rotating the rotational member, where the rotational member is coupled to a first end of a linear actuator at a forward attach point, where the linear actuator comprises the first end and a second end, and where the forward attach point is eccentric to the rotational center of the rotational member. The method also includes translating the forward attach point relative to the aircraft wing based on the rotation of the rotational member.

In another example, an aircraft is described including an aircraft wing, where the aircraft wing includes a first control surface and a second control surface. The aircraft also includes a system for mechanical operation of the aircraft wing. The system of the aircraft includes a torque tube coupled to the first control surface, where the torque tube is rotatable at a first rate of rotation to cause a downward rotation of the first control surface relative to the aircraft wing. The system of the aircraft also includes a gearing assembly coupled to the torque tube, where the gearing assembly comprises an output shaft, and where the torque tube is configured to rotate the output shaft, via the gearing assembly, at a second rate of rotation that is less than the first rate of rotation of the torque tube. The system of the aircraft also includes a rotational member coupled to the output shaft of the gearing assembly, where the output shaft is rotatable to drive a rotation of the rotational member, and where a rotational center of the output shaft and a rotational center of the rotational member are concentric. The system of the aircraft also includes a linear actuator comprising a first end and a second end, where the first end of the linear actuator is coupled to the rotational member at a forward attach point, where the forward attach point is eccentric to the rotational center of the rotational member, and where the rotational member is rotatable to cause a translation of the forward attach point relative to the aircraft wing. The system of the aircraft also includes the second control surface coupled to the second end of the linear actuator, where the forward attach point is translatable, via rotation of the rotational member, to cause a downward rotation of the second control surface relative to the aircraft wing.

The features, functions, and advantages that have been discussed can be achieved independently in various examples or may be combined in yet other examples, further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

Disclosed examples will now be described more fully with reference to the accompanying Figures, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Examples discussed herein include systems and methods for mechanical operation of an aircraft wing. For example, the aircraft wing may include a torque tube that drives the movement of the flaps on the trailing edge of the aircraft wing. Further, the aircraft wing may include a system that mechanically connects the torque tube to the spoilers, which are generally located on a top side of the wing, forward of the flap. The system may allow the movement of the flaps and spoilers of the aircraft wing to both be mechanically tied to the torque tube, rather than the spoilers being raised and lowered by an independently-controlled system.

By the term "about" or "substantial" and "substantially" or "approximately," with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

Figure 1:
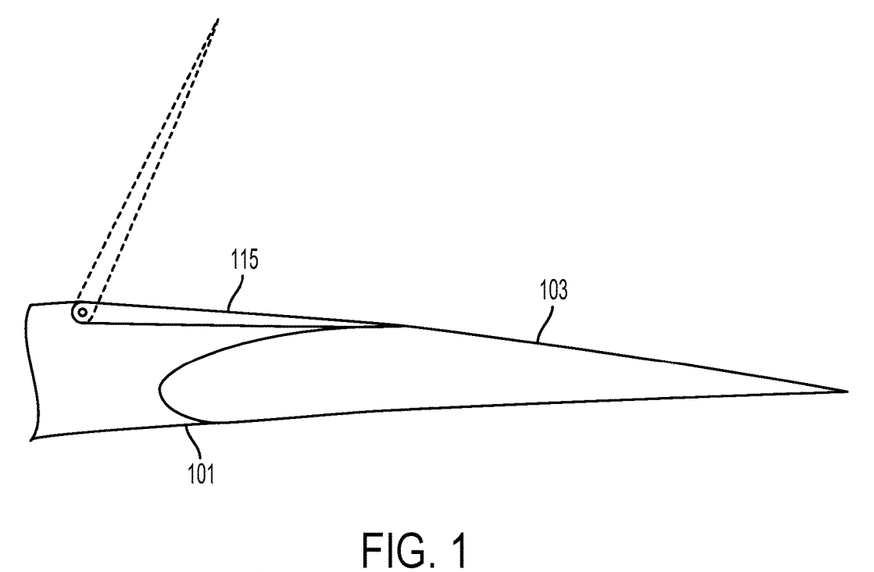
FIG. 1 illustrates a side view of an aircraft wing including control surfaces in a first position, according to an example implementation.

Referring now to FIG. 1, a side view of an aircraft wing 101 is shown. The aircraft wing 101 includes a first control surface 103, or flap, and a second control surface 115, or spoiler. As shown in FIG. 1, the second control surface 115 may be moved from a first position to a second, raised position as shown in dashed lines. The second control surface 115 may be raised in this way, or to any intermediate position, to increase drag and/or reduce lift of the aircraft wing 101. The second control surface 115 may also be raised to help slow the aircraft upon landing. Other possibilities and uses for the second control surface 115 also exist.

Figure 2:
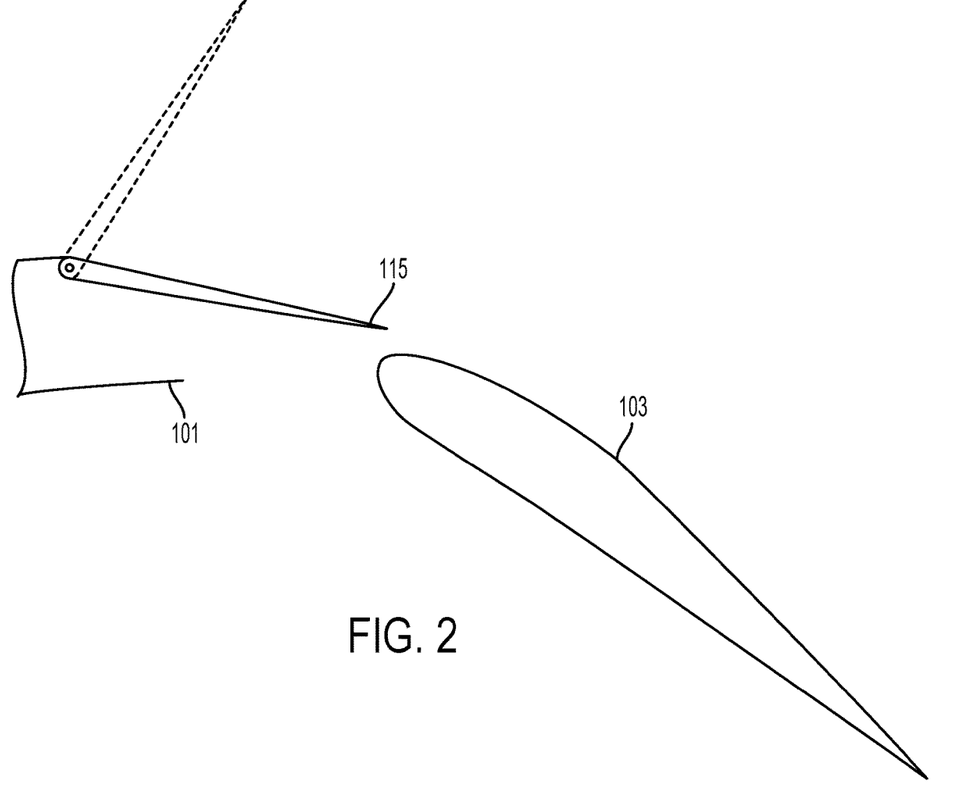
FIG. 2 illustrates another side view of an aircraft wing including control surfaces in a second position, according to an example implementation.

As shown in FIG. 2, the first control surface 103, or flap, may be rotated downward with respect to the aircraft wing 101 to increase lift, reduce speed, and/or increase the angle of descent during landing operations, for example. In some examples, the first control surface 103 may be translated aft as well as rotated downward, as seen in FIG. 2. When the first control surface 103 is extended in this way, a gap is created between the first control surface 103 and the forward portion of the aircraft wing 101. For clarity of viewing the elements discussed herein, FIG. 2 omits other supporting structures of the aircraft wing 101, such as a linkage that may be coupled to the first control surface 103 to facilitate rotating and translating the first control surface 103.

The size of the resulting gap between the first control surface 103 and the forward portion of the aircraft wing 101, in combination with the degree to which the first control surface 103 is rotated, affects the aerodynamic performance of the aircraft wing 101 by, for example, enhancing lift characteristics and reducing drag. The size of the gap may be based in part on the rotation and/or extension of the first control surface 103. Additionally, the second control surface 115 may be lowered, or drooped, as shown in FIG. 2, to further control the size of the gap. In some situations, this may allow for greater extension of the first control surface 103, while still maintaining a desired gap size. Moreover, drooping the second control surface 115 may provide other aerodynamic effects as well, such as increasing lift on the forward portion of the aircraft wing 101.

In some examples, the downward rotation of the first control surface 103 shown in FIG. 2 may be between about 30 and about 40 degrees relative to the aircraft wing 101. However, the second control surface 115 may require relatively less corresponding movement to control the size of the gap in the aircraft wing 101 that is created by the rotation of the first control surface 103. For example, the downward rotation of the second control 115 surface may be between about 10 and about 15 degrees relative to the aircraft wing 101.

Figure 3:
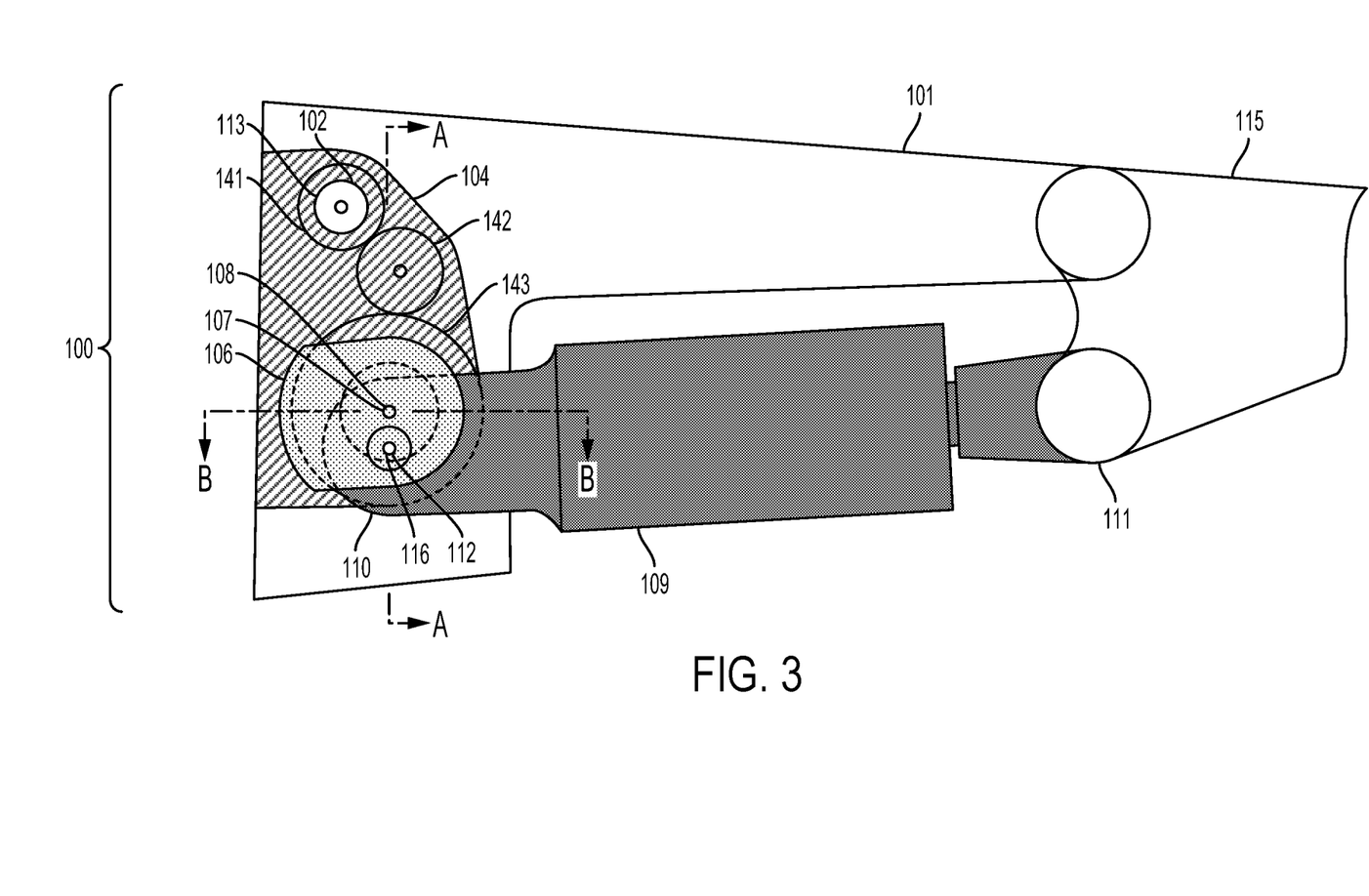
FIG. 3 illustrates a side view of a system for mechanical operation of an aircraft wing, according to an example implementation.
Figure 4:
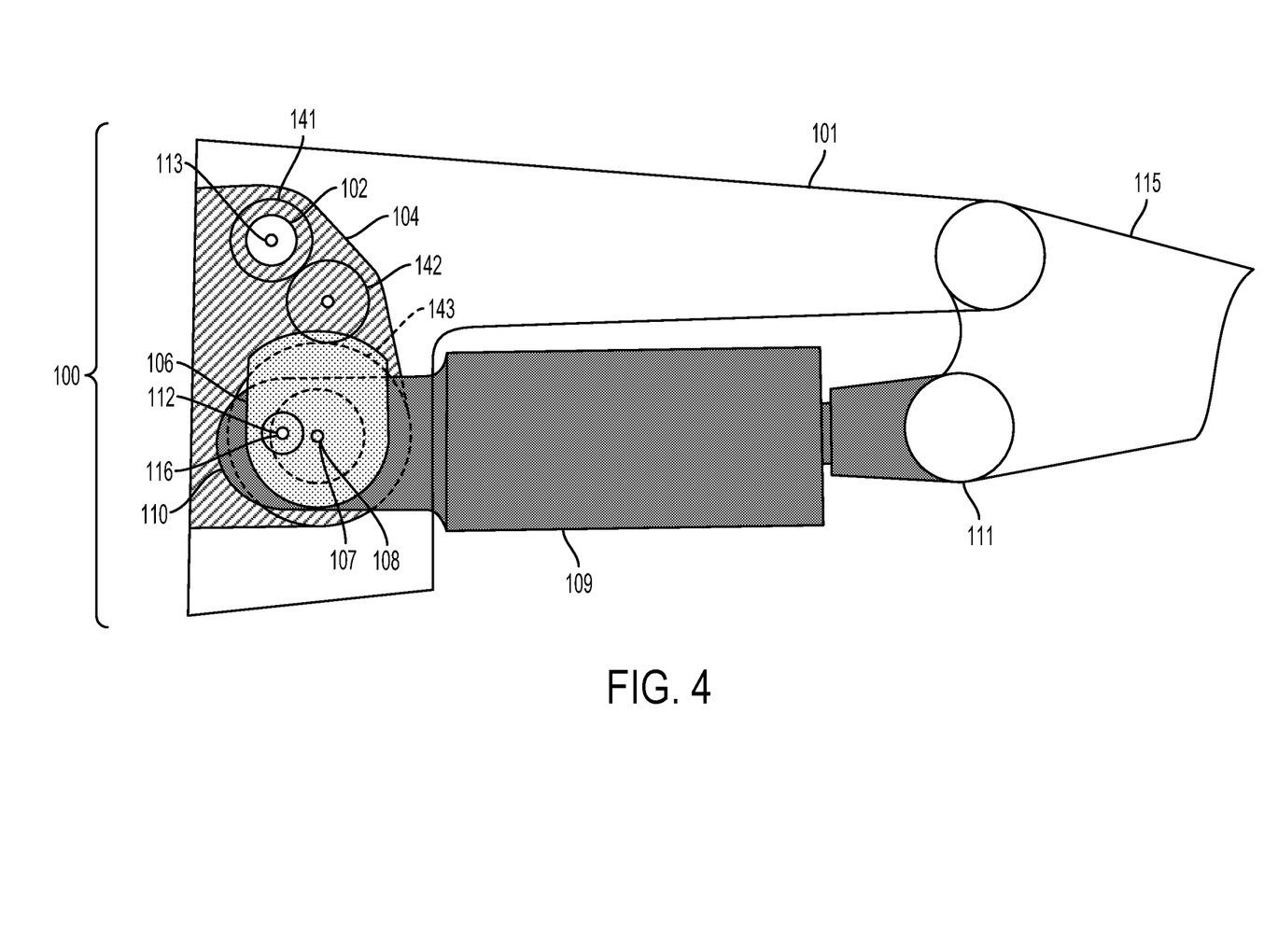
FIG. 4 illustrates a side view of a system for mechanical operation of an aircraft wing, according to an example implementation.
Figure 5:
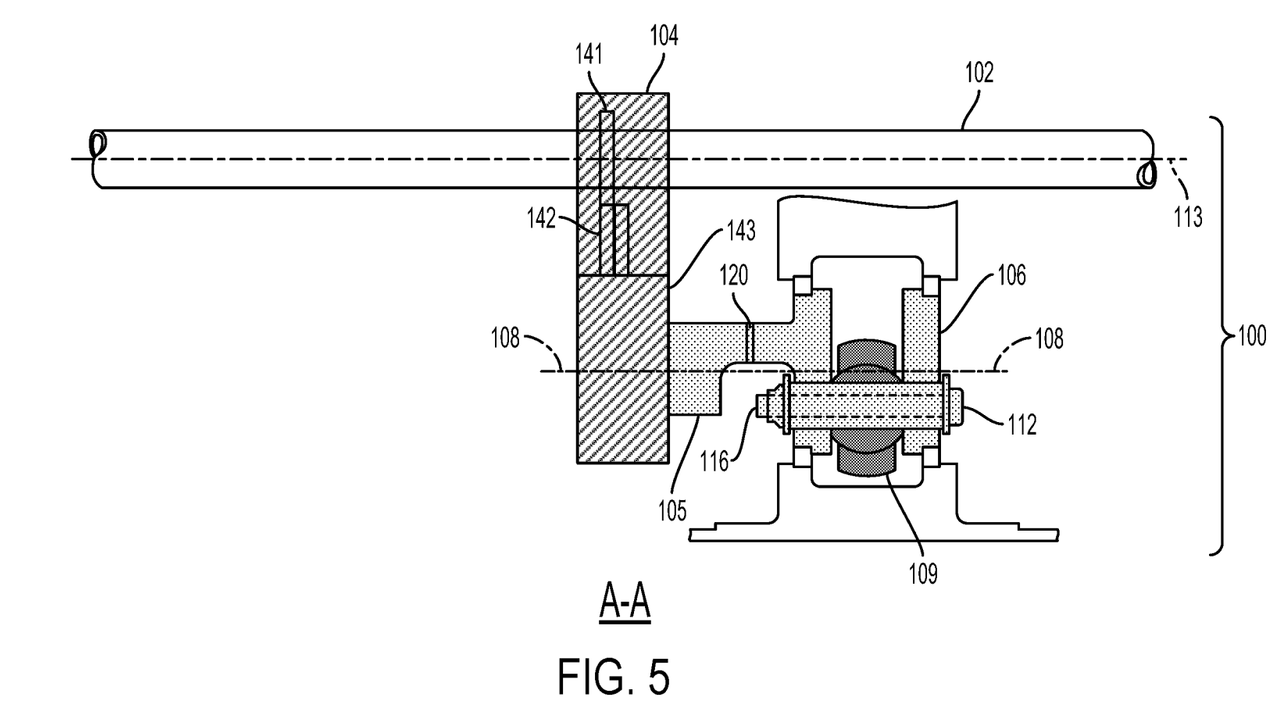
FIG. 5 illustrates a rearward-facing cross sectional view of a system for mechanical operation of an aircraft wing, according to an example implementation.
Figure 6:
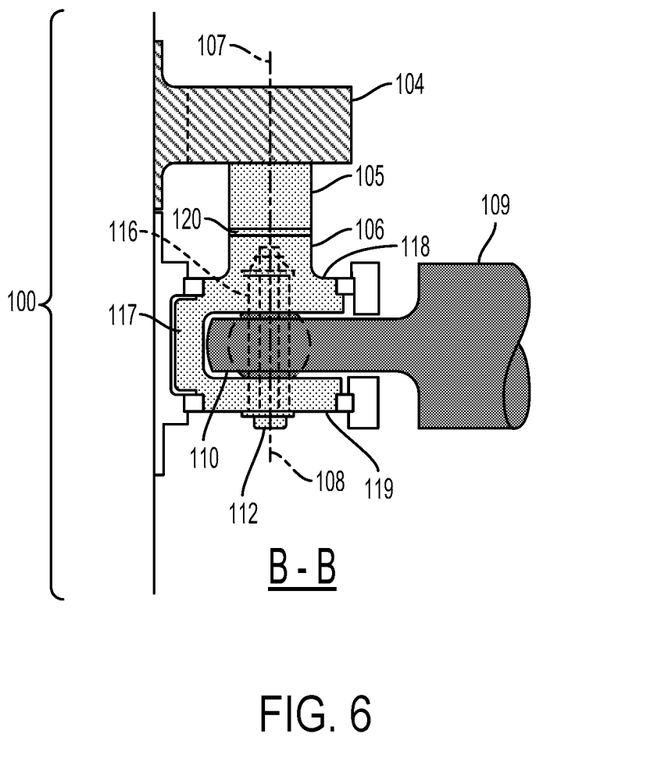
FIG. 6 illustrates a downward-facing cross sectional view of a system for mechanical operation of an aircraft wing, according to an example implementation.

FIGS. 3-6 illustrate a system 100 for mechanical operation of an aircraft wing 101 to accomplish this downward rotation of the second control surface 115 discussed above, according to an example implementation. For clarity of showing the components of system 100, FIGS. 3-6 are a close-up view of the connection of the second control surface 115 to the aircraft wing 101, and the first control surface 103 is not shown. However, the first control surface 103 may be similarly positioned with respect to the aircraft wing 101 and the second control surface 115 as the first control surface 103 shown in FIGS. 1 and 2. FIG. 3 illustrates a side view of the system 100 with the second control surface 115 in a first, starting position, and FIG. 4 illustrates a side view of the system 100 with the second control surface 115 in a second, drooped position. FIG. 5 shows the cross-sectional view A-A indicated in FIG. 3, facing toward the rear of the aircraft wing 101. FIG. 6 shows the downward facing cross-sectional view B-B indicated in FIG. 3.

The system 100 includes a torque tube 102, which is shown in cross-section in FIG. 3, and may be seen more clearly in FIG. 5. The torque tube 102 may extend laterally along the aircraft wing 101 and may be coupled to a motor situated in the body of the aircraft, for example. The motor may drive a rotation of the torque tube 102. The torque tube 102 may be further coupled to the first control surface 103 of the aircraft wing 101. The torque tube 102 may be rotatable at a first rate of rotation to cause a downward rotation of the first control surface 103 relative to the aircraft wing 101, as shown in FIGS. 1 and 2. In some examples, the torque tube 102 may be coupled to the first control surface 103 via a linkage that causes both the rotation and a translation of the first control surface 103, as noted above. The first rate of rotation of the torque tube 102 may be, for example, 600 rpm, and the first control surface 103 may be coupled to the torque tube 102 via a transmission to convert the rotation of the torque tube 102 into the rotation of the first control surface 103.

The system 100 shown in FIGS. 3-6 further includes a gearing assembly 104 coupled to the torque tube 102. The gearing assembly 104 may include an output shaft 105, seen most clearly in FIGS. 5 and 6. As noted above, because the rotation of the second control surface 115 between FIGS. 3 and 4 is relatively small, the required rotation of the output shaft 105 to droop the second control surface 115 may also be relatively small. Therefore, the gearing assembly 104 may include one or more interconnected gears to reduce the first rate of rotation of the torque tube 102. Accordingly, the torque tube 102 is configured to rotate the output shaft 105, via the gearing assembly 104, at a second rate of rotation that is less than the first rate of rotation of the torque tube 102.

In some examples, the gear ratio reduction between the first rate of rotation and the second rate of rotation may be on the order of 1/1000.

For instance, FIGS. 3-5 show a first gear 141 coupled to the torque tube 102, and thus it may rotate at the same rate as the torque tube 102. A second gear 142 of the gearing assembly 104 may engage the first gear 141, and may include a first gear ratio reduction. A third gear 143 may be further engaged with the second gear 142, and may include a second gear ratio reduction. The third gear 143 may then be coupled to the output shaft 105. In some examples, the third gear 143 may take the form of a strain wave reduction gear, which may allow for a relatively large gear reduction in a relatively compact space. The gearing assembly 104 may include more or fewer gears, in numerous other possible arrangements.

The system 100 shown in FIGS. 3-6 further includes a rotational member 106 coupled to the output shaft 105 of the gearing assembly 104. Thus, the output shaft 105 is configured to drive a rotation of the rotational member 106. Further, as can be seen in FIGS. 5 and 6, a rotational center 107 of the output shaft 105 and a rotational center 108 of the rotational member 106 are concentric. Conversely, a rotational center 113 of the torque tube 102, as seen in FIG. 5, is not concentric with the rotational member 106.

The system 100 further includes a linear actuator 109 having a first end 110 and a second end 111. The linear actuator 109 may be, for example, a hydraulic actuator, and the second end 111 may be coupled to the second control surface 115. Thus, the linear actuator 109 may be extendable in order to rotate the second control surface 115 upward relative to the aircraft wing 101, as in the example shown in FIG. 1. However, drooping the second control surface 115, as in the example shown in FIG. 2, might not involve actuation of the linear actuator 109 in the system 100.

Instead, the first end 110 of the linear actuator 109 is coupled to the rotational member 106 at a forward attach point 112, which may be eccentric to the rotational center 108 of the rotational member 106. This may be seen in FIGS. 3-5, where the forward attach point 112 is shown offset from the rotational center 108 of the rotational member 106. Thus, as the rotational member 106 rotates, the forward attach point 112 will orbit the rotational center 108 of the rotational member 106. Accordingly, the rotational member 106 may be rotatable to cause a translation of the forward attach point 112 relative to the aircraft wing 101.

For instance, FIG. 3 shows the rotational member 106 in a first position, where the forward attach point 112 of the linear actuator 109 to the rotational member 106 is roughly beneath the rotational center 108 of the rotational member 106. Further, the second control surface 115, coupled to the linear actuator 109, is in its starting position. In FIG. 4, the rotational member 106 has rotated clockwise approximately 90 degrees, leading to a forward and upward translation of the forward attach point 112, relative to the aircraft wing 101. As a result, the second control surface 115 has been pulled downward into a drooped position. In some examples, the translations of the forward attach point 112 may be relatively small, such as one inch or less. Nonetheless, the rotation of rotational member 106 is configured to cause a downward rotation of the second control surface 115 relative to the aircraft wing 101, via the translation of the forward attach point 112.

In this drooped orientation, the second control surface 115 may still be independently actuated in an upward direction, via extension of the linear actuator 109. However, the maximum upward rotation of the second control surface 115 relative to the aircraft wing 101 may be reduced, due to the mechanically implemented droop discussed above. For example, referring back to FIG. 2, the dashed lines show the second control surface 115 in a raised position—although not raised as far as the dashed lines shown in FIG. 1, wherein the second control surface 115 is not drooped.

In some examples, the first end 110 of the linear actuator 109 may be coupled to the rotational member 106 at the forward attach point 112 via a pin joint 116, as shown in the example of FIGS. 3-6. Further, the rotational member 106 may include a U-shaped portion 117 having a first leg 118 and a second leg 119, as seen most clearly in FIG. 6. The U-shaped portion 117 of the rotational member 106 straddles the first end 110 of the linear actuator 109. The pin joint 116 extends from the first leg 118, through the first end 110 of the linear actuator 109, to the second leg 119. In this arrangement, the linear actuator 109 is rotatable relative to the rotational member 106 via the pin joint 116. Further, this arrangement approximates a four-bar linkage between the rotational member 106, linear actuator 109, second control surface 115, and the aircraft wing 101.

In addition to mechanically positioning the second control surface 115 in the desired droop position when the first control surface 103 is fully rotated, the system 100 may also be configured such that the second control surface 115 is progressively rotated in a manner that corresponds to the progressive rotation of the first control surface 103. For example, the torque tube 102 may rotate the first control surface 103 from its starting position to one or more partially rotated positions before reaching a fully rotated position. Accordingly, the system 100 may be configured such that the torque tube 102 concurrently rotates the second control surface 115, via the gearing assembly 104 and the rotational member 106, to one or more partially drooped positions that provide the appropriate gap between the second control surface 115 and the first control surface 103.

The system 100 may also be configured to work in reverse, to return the second control surface 115 shown in FIG. 4 to it starting point in FIG. 3. For instance, while the torque tube 102 is rotatable in a first direction to cause the downward rotation of the first control surface 103, it may be further rotatable in a second direction, opposite the first direction, to cause an upward rotation of the first control surface 103 relative to the aircraft wing 101. Moreover, this reversed rotation of the torque tube 102 may also cause, via the gearing assembly 104 and the rotational member 106, an upward rotation of a second control surface 115 relative to the aircraft wing 101.

Within examples, one advantage of the system 100 over some prior applications is that it may reduce the possibility that operation of the second control surface will fail independently of the first control surface. For instance, some prior implementations utilize the same linear actuator that is used for the upward rotation of the second control surface to droop the second control surface via a downward rotation. This may be accomplished by retracting the linear actuator instead of extending it. In such an implementation, a loss of control authority over the linear actuator may result in the second control surface being in a fully drooped position and unable to rotate back upwards on its own. In this situation, when the first control surface needs to rotate back upward, it may need to back drive the linear actuator and/or the second control surface, pushing them out of the way. This causes an increased load on the involved components, which must be accounted for. For instance, the hydraulic linear actuator may need to be designed with a pressure relief valve in order to allow the first control surface to force it back to its starting position, among other possibilities. This may increase the size of components, add mass, as well as increase cost. Conversely, in the system 100, the rotation of both the first control surface 103 and the second control surface 115 are tied to the torque tube 102 via relatively more reliable mechanical components.

Nonetheless, the system 100 may provide for back driving the second control surface 115 and linear actuator 109 to their starting position, in the event that, for example, the gearing assembly 104 jams and can no longer transfer the rotational movement of the torque tube 102 to the rotational member 106. To account for this possibility, one or more of the mechanical components in the system 100 may be provided with a breakaway joint 120, such as a shear joint. The breakaway joint 120 may be located between the gearing assembly 104 and the second control surface 115, as shown in FIGS. 5 and 6. The breakaway joint 120 is configured to decouple the gearing assembly 104 from the second control surface 115 in response to a force that is greater than a breakaway force acting on the breakaway joint.

For example, the forces acting on the breakaway joint 120 during normal operation of the system 100 may not exceed the designed breakaway force. However, following a failure of the gearing assembly 104, for example, the first control surface 103 may need to back drive the second control surface 115. This may cause the forces acting on the breakaway joint 120 to exceed the breakaway force, causing the breakaway joint 120 to decouple from the adjoining components. In some implementations, the breakaway joint 120 may be located on the rotational member 106, between the forward attach point 112 and the output shaft 105 of the gearing assembly 104, such that the breakaway joint 120 is configured to decouple the rotational member 106 from the output shaft 105. Other locations are also possible.

Figure 7:
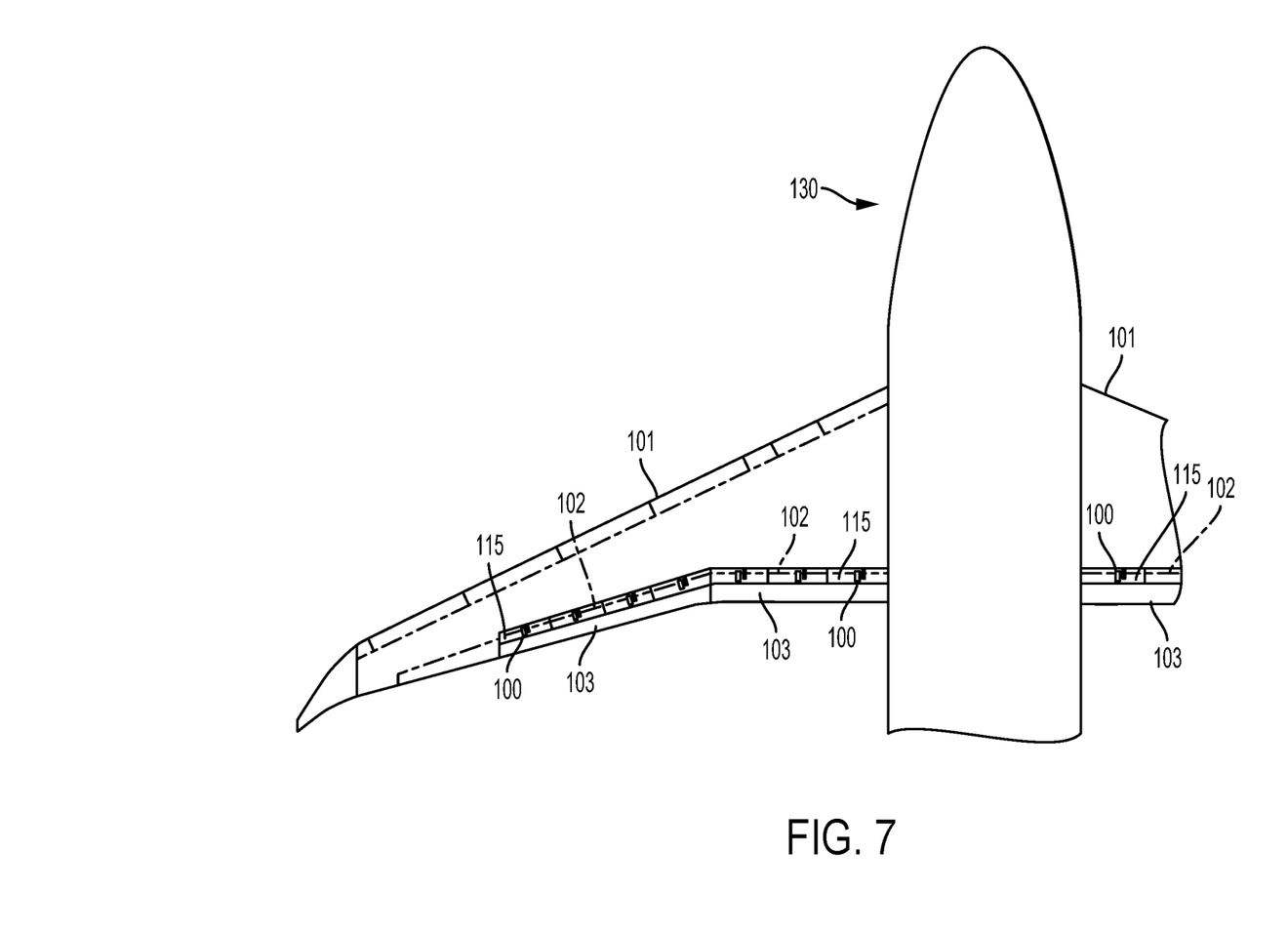
FIG. 7 illustrates a top view of an aircraft, according to an example implementation.

In some examples, the system 100 may be utilized on an aircraft 130, as shown in FIG. 7. The aircraft 130 may include a plurality of aircraft wings 101, and each aircraft wing 101 may include a plurality of respective first control surfaces 103. Further, each first control surface 103 may correspond to a plurality of respective second control surfaces 115, and each second control surface 115 may correspond to a respective gearing assembly 104, output shaft 105, rotational member 106, and linear actuator 109.

Figure 8:
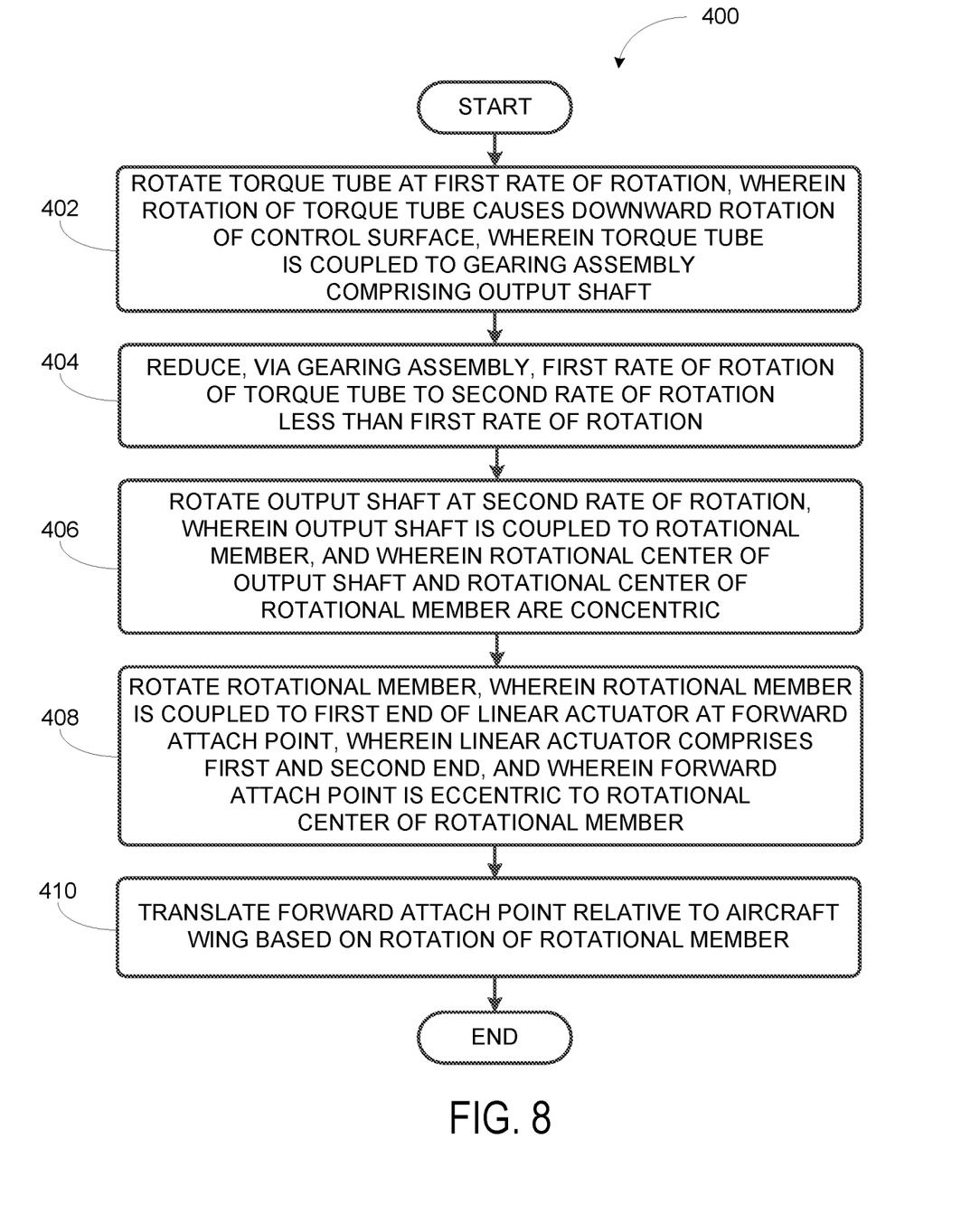
FIG. 8 shows a flowchart of an example method for mechanically operating an aircraft wing, according to an example implementation.

FIG. 8 shows a flowchart of a method 400 for mechanically operating an aircraft wing, according to an example implementation. Method 400 shown in FIG. 8 presents an example of a method that, for example, could be used with the system 100, as shown in FIGS. 3-7 and discussed above. It should be understood that for this and other processes and methods disclosed herein, flowcharts show functionality and operation of one possible implementation of present examples. In this regard, each block in the flowchart may represent a module, a segment, or a portion of program code, which includes one or more instructions executable by a processor for implementing or causing specific logical functions or steps in the process. For example, the method 400 may be implemented by one or more computing devices of a robotic assembly system. Alternative implementations are included within the scope of the examples of the present disclosure, in which functions may be executed out of order from that shown or discussed, including substantially concurrently, depending on the functionality involved, as would be understood by those reasonably skilled in the art.

At block 402, the method 400 includes rotating a torque tube 102 at a first rate of rotation. As discussed above, the rotation of the torque tube 102 may cause a downward rotation of a first control surface 103, as shown in the example of FIG. 2. The torque tube 102 is also coupled to a gearing assembly 104 that includes an output shaft 105, as shown in FIGS. 3-6. In some implementations, the downward rotation of the first control surface 103 may be between about 30 and about 40 degrees, among other possibilities.

At block 404, the method 400 includes reducing, via the gearing assembly 104, the first rate of rotation of the torque tube 102 to a second rate of rotation that is less than the first rate of rotation. For example, as noted above, the gearing assembly 104 may include one or more gears to transfer the rotational motion of the torque tube 102 to the output shaft 105, as shown in FIGS. 3-5. The gears may further include one or more gear ratio reductions. In some examples, one of the gears in the gearing assembly 104 may be a strain wave reduction gear. Accordingly, reducing the first rate of rotation may include rotating the strain wave reduction gear. Other gearing arrangements for reducing the first rate of rotation of the torque tube 102 are also possible.

At block 406, the method 400 includes rotating the output shaft 105 at the second rate of rotation, where the output shaft 105 is coupled to a rotational member 106. As discussed above and as illustrated in FIGS. 3-6, a rotational center 107 of the output shaft 105 and a rotational center 108 of the rotational member 106 are concentric.

At block 408, the method 400 includes rotating the rotational member 106. The rotational member 106 is coupled to a first end 110 of a linear actuator 109 at a forward attach point 112. The linear actuator 109 further includes a second end 111, which may be coupled to a second control surface 115. As discussed above and as shown in FIG. 3-5, the forward attach point 112 is eccentric to the rotational center 108 of the rotational member 106.

In some examples, the first end 110 of the linear actuator 109 may be coupled to the rotational member 106 at the forward attach point 112 via a pin joint 116. Thus, rotating the rotational member 106 includes rotating the linear actuator 109 about the pin joint 116 relative to the rotational member 106, as can be seen by comparing FIGS. 3 and 4.

At block 410, the method 400 includes translating the forward attach point 112 relative to the aircraft wing 101 based on the rotation of the rotational member 106. As discussed above, this can also be seen comparing FIG. 3 and FIG. 4. Further, translating the forward attach point 112 relative to the aircraft wing 101 may also include rotating the second control surface 115 downward relative to the aircraft wing 101, based on the translation of the forward attach point 112 and the connectivity of the linear actuator 109 between the forward attach point 112 and the second control surface 115. For example, rotating the second control surface 115 downward relative to the aircraft wing 101 may include rotating the second control surface 115 between about 10 and about 15 degrees.

As discussed above, rotating the torque tube 102 to cause the downward rotation of the first control surface 103 may involve rotating the torque tube in a first direction. In some examples, the method 400 may further include rotating the torque tube 102 in a second direction opposite the first direction to cause an upward rotation of the first control surface 103 relative to the aircraft wing 101. Further, rotating the torque tube 102 in the second direction may also rotate, via the gearing assembly 104 and the rotational member 106, the second control surface 115 upward relative to the aircraft wing 101.

In some examples, as mentioned above, the system 100 may include a breakaway joint 120 between the gearing assembly 104 and the second control surface 115. Thus, in some implementations, the method 400 may include decoupling the gearing assembly 104 from the second control surface 115, at the breakaway joint 120, in response to a force that is greater than a breakaway force acting on the breakaway joint 120.

In particular, the breakaway joint 120 may be located on the rotational member 106 between the forward attach point 112 and the output shaft 105 of the gearing assembly 104. In this arrangement, decoupling the gearing assembly 104 from the second control surface 115 may include decoupling the rotational member 106 from the output shaft 105, at the breakaway joint 120.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A system for mechanical operation of an aircraft wing, comprising:
    a torque tube coupled to a control surface of the aircraft wing, wherein the torque tube is rotatable at a first rate of rotation to cause a downward rotation of the control surface relative to the aircraft wing;
    a gearing assembly coupled to the torque tube, wherein the gearing assembly comprises an output shaft, and wherein the torque tube is configured to rotate the output shaft, via the gearing assembly, at a second rate of rotation that is less than the first rate of rotation of the torque tube;
    a rotational member coupled to the output shaft of the gearing assembly, wherein the output shaft is configured to drive a rotation of the rotational member, and wherein a rotational center of the output shaft and a rotational center of the rotational member are concentric; and
    a linear actuator comprising a first end and a second end, wherein the first end of the linear actuator is coupled to the rotational member at a forward attach point, wherein the forward attach point is eccentric to the rotational center of the rotational member, and wherein the rotational member is rotatable to cause a translation of the forward attach point relative to the aircraft wing, wherein the rotational member comprises a first leg and a second leg coupled by a curved portion, wherein the first leg and the second leg of the rotational member straddle the first end of the linear actuator, and wherein a pin joint extends from the first leg, through the first end of the linear actuator, to the second leg.

2. The system of claim 1, wherein a rotational center of the torque tube and the rotational center of the rotational member are not concentric.

3. The system of claim 1, wherein the gearing assembly comprises a strain wave reduction gear.

4. The system of claim 1, wherein the control surface is a first control surface, wherein the second end of the linear actuator is coupled to a second control surface of the aircraft wing, and wherein the rotation of the rotational member is configured to cause a downward rotation of the second control surface relative to the aircraft wing.

5. The system of claim 4, wherein the downward rotation of the first control surface is between about 30 and about 40 degrees relative to the aircraft wing, and wherein the downward rotation of the second control surface is between about 10 and about 15 degrees relative to the aircraft wing.

6. The system of claim 1, wherein the control surface is a first control surface, wherein the torque tube is rotatable in a first direction to cause the downward rotation of the first control surface, wherein the torque tube is rotatable in a second direction opposite the first direction to cause an upward rotation of the first control surface relative to the aircraft wing, and to further cause, via the gearing assembly and the rotational member, an upward rotation of a second control surface relative to the aircraft wing.

7. The system of claim 1, wherein the first end of the linear actuator is coupled to the rotational member at the forward attach point via the pin joint, and wherein the linear actuator is rotatable relative to the rotational member via the pin joint.

8. The system of claim 1, wherein the control surface is a first control surface, wherein the second end of the linear actuator is coupled to a second control surface of the aircraft wing, wherein the system comprises a breakaway joint between the gearing assembly and the second control surface, and wherein the breakaway joint is configured to decouple the gearing assembly from the second control surface in response to a force that is greater than a breakaway force acting on the breakaway joint.

9. The system of claim 8, wherein the breakaway joint is located on the rotational member between the forward attach point and the output shaft of the gearing assembly, and wherein the breakaway joint is configured to decouple the rotational member from the output shaft.

10. A method for mechanically operating an aircraft wing, comprising:
    rotating a torque tube at a first rate of rotation, wherein the rotation of the torque tube causes a downward rotation of a control surface, wherein the torque tube is coupled to a gearing assembly comprising an output shaft;
    reducing, via the gearing assembly, the first rate of rotation of the torque tube to a second rate of rotation that is less than the first rate of rotation;
    rotating the output shaft at the second rate of rotation, wherein the output shaft is coupled to a rotational member, and wherein a rotational center of the output shaft and a rotational center of the rotational member are concentric;
    rotating the rotational member, wherein the rotational member is coupled to a first end of a linear actuator at a forward attach point, wherein the linear actuator comprises the first end and a second end, and wherein the forward attach point is eccentric to the rotational center of the rotational member, wherein the rotational member comprises a first leg and a second leg coupled by a curved portion, wherein the first leg and the second leg of the rotational member straddle the first end of the linear actuator, and wherein a pin joint extends from the first leg, through the first end of the linear actuator, to the second leg; and
    translating the forward attach point relative to the aircraft wing based on the rotation of the rotational member.

11. The method of claim 10, wherein the gearing assembly comprises a strain wave reduction gear, and wherein reducing the first rate of rotation of the torque tube comprises rotating the strain wave reduction gear.

12. The method of claim 10, wherein the control surface is a first control surface, wherein the second end of the linear actuator is coupled to a second control surface of the aircraft wing, further comprising:
rotating the second control surface downward relative to the aircraft wing based on the translation of the forward attach point.

13. The method of claim 12, wherein the downward rotation of the first control surface is between about 30 and about 40 degrees, and wherein rotating the second control surface downward relative to the aircraft wing comprises rotating the second control surface between about 10 and about 15 degrees.

14. The method of claim 12, wherein the torque tube is rotatable in a first direction to cause the downward rotation of the first control surface, further comprising:
rotating the torque tube in a second direction opposite the first direction to cause an upward rotation of the first control surface relative to the aircraft wing; and
rotating, via the gearing assembly and the rotational member, the second control surface upward relative to the aircraft wing.

15. The method of claim 10, wherein the first end of the linear actuator is coupled to the rotational member at the forward attach point via a pin joint, and wherein rotating the rotational member comprises rotating the linear actuator about the pin joint relative to the rotational member.

16. The method of claim 10, wherein the control surface is a first control surface, wherein the second end of the linear actuator is coupled to a second control surface of the aircraft wing, and wherein the aircraft wing comprises a breakaway joint between the gearing assembly and the second control surface, further comprising:
decoupling the gearing assembly from the second control surface, at the breakaway joint, in response to a force that is greater than a breakaway force acting on the breakaway joint.

17. The method of claim 16, wherein the breakaway joint is located on the rotational member between the forward attach point and the output shaft of the gearing assembly, and wherein decoupling the gearing assembly from the second control surface comprises decoupling the rotational member from the output shaft, at the breakaway joint.

18. An aircraft comprising:
an aircraft wing, wherein the aircraft wing comprises a first control surface positioned adjacent to a second control surface;
a system for mechanical operation of the aircraft wing, wherein the system comprises:
a torque tube coupled to the first control surface, wherein the torque tube is rotatable at a first rate of rotation to cause a downward rotation of the first control surface relative to the aircraft wing;
a gearing assembly coupled to the torque tube, wherein the gearing assembly comprises an output shaft, and wherein the torque tube is configured to rotate the output shaft, via the gearing assembly, at a second rate of rotation that is less than the first rate of rotation of the torque tube;
a rotational member coupled to the output shaft of the gearing assembly, wherein the output shaft is rotatable to drive a rotation of the rotational member, and wherein a rotational center of the output shaft and a rotational center of the rotational member are concentric; and
a linear actuator comprising a first end and a second end, wherein the first end of the linear actuator is coupled to the rotational member at a forward attach point, wherein the forward attach point is eccentric to the rotational center of the rotational member, and wherein the rotational member is rotatable to cause a translation of the forward attach point relative to the aircraft wing; and
wherein the rotational member comprises a first leg and a second leg coupled by a curved portion, wherein the first leg and the second leg of the rotational member straddle the first end of the linear actuator, and wherein a pin joint extends from the first leg, through the first end of the linear actuator, to the second leg, and
wherein the second control surface is coupled to the second end of the linear actuator, and wherein the forward attach point is translatable, via rotation of the rotational member, to cause a downward rotation of the second control surface relative to the aircraft wing.

19. The aircraft of claim 18, wherein the aircraft comprises a plurality of aircraft wings, wherein each aircraft wing comprises a plurality of respective first control surfaces, wherein each first control surface corresponds to a plurality of respective second control surfaces, and wherein each second control surface corresponds to a respective gearing assembly, output shaft, rotational member, and linear actuator.

20. The aircraft of claim 18, wherein the torque tube is rotatable in a first direction to cause the downward rotation of the first control surface, wherein the torque tube is rotatable in a second direction opposite the first direction to cause an upward rotation of the first control surface relative to the aircraft wing, and to further cause, via the gearing assembly and the rotational member, an upward rotation of the second control surface relative to the aircraft wing.

* * * * *